United States Patent
Wang

(10) Patent No.: US 7,248,387 B2
(45) Date of Patent: Jul. 24, 2007

(54) SCANNING SPEED CONTROL DEVICE AND METHOD

(75) Inventor: Kuo-Jeng Wang, Kaohsiung (TW)

(73) Assignee: Umax Data Systems, Inc., Hsinchu, Taiwan (CN)

( * ) Notice: Subject to any disclaimer, the term of this patent is extended or adjusted under 35 U.S.C. 154(b) by 701 days.

(21) Appl. No.: 09/920,387

(22) Filed: Jul. 31, 2001

(65) Prior Publication Data

US 2003/0025949 A1    Feb. 6, 2003

(51) Int. Cl.
H04N 1/04    (2006.01)

(52) U.S. Cl. ............... 358/474; 358/444; 358/404; 358/412; 382/312; 382/313

(58) Field of Classification Search ........... 358/500, 358/444, 404, 474, 412, 523, 471; 382/312, 382/313
See application file for complete search history.

(56) References Cited

U.S. PATENT DOCUMENTS

| | | | | |
|---|---|---|---|---|
| 4,638,156 A * | 1/1987 | Horikawa et al. | ........... | 250/235 |
| 4,700,066 A * | 10/1987 | Horikawa | ........... | 250/234 |
| 4,748,514 A * | 5/1988 | Bell | ........... | 358/486 |
| 5,018,716 A * | 5/1991 | Yoshida et al. | ........... | 271/227 |
| 5,289,000 A * | 2/1994 | Toyofuku | ........... | 250/234 |
| 5,381,020 A * | 1/1995 | Kochis et al. | ........... | 250/566 |
| 5,517,331 A | 5/1996 | Murai et al. | | |
| 5,805,312 A * | 9/1998 | Ozawa et al. | ........... | 358/503 |
| 5,943,139 A * | 8/1999 | Tang et al. | ........... | 358/412 |
| 6,115,149 A * | 9/2000 | Lai et al. | ........... | 358/505 |
| 6,147,776 A * | 11/2000 | Sakurai et al. | ........... | 358/471 |
| 6,160,636 A * | 12/2000 | Nagano et al. | ........... | 358/412 |
| 6,262,816 B1 * | 7/2001 | Rindsig et al. | ........... | 358/498 |
| 6,335,807 B1 * | 1/2002 | Neale et al. | ........... | 358/486 |
| 6,490,057 B1 * | 12/2002 | Sakaguchi | ........... | 358/412 |
| 6,515,774 B2 * | 2/2003 | Horiuchi et al. | ........... | 358/474 |
| 6,525,843 B1 * | 2/2003 | Yu | ........... | 358/412 |
| 6,661,541 B1 * | 12/2003 | Chang | ........... | 358/474 |
| 2001/0035985 A1 * | 11/2001 | Takahashi et al. | ........... | 358/471 |

* cited by examiner

*Primary Examiner*—Aung S. Moe
*Assistant Examiner*—Negussie Worku
(74) *Attorney, Agent, or Firm*—Marger Johnson & McCollom PC

(57) ABSTRACT

A control device and a method for controlling scanning speed of a scanner. The control device includes a decision device and a driving device. The decision device further includes an image buffer, an up-down counter and a comparator. The decision device receives the input image data and utilizes the up-down counter to compute data access volume inside the image buffer. The comparator decides whether to increase or decrease the scanning speed according to the data access volume and also outputs decision data to the driving device.

9 Claims, 2 Drawing Sheets

SCANNING SPEED CONTROL DEVICE AND METHOD

BACKGROUND OF THE INVENTION

1. Field of Invention

The present invention relates to a scanning control device and a scanning speed control method. More particularly, the present invention relates to a scanning speed control device and a scanning speed control method.

2. Description of Related Art

Due to rapid progress in office equipment technologies, various types of complementary systems including the auto-document feeder (ADF) are developed. An auto-document feeder (ADF) can be applied to different types of machines such as a printer, a photocopier or a scanner so that paper is fed into the machine without manual labor. If the auto-feeder contains papers, the processor unit (a processor or an application specific integrated circuit) inside the machine detects the presence of papers through sensors. When a machine having an auto-feeder needs paper, paper is automatically fed into the machine according to controlling signal produced by the processor unit. Thus, auto-feeder facilitates the operation of most machines. However, when an auto-feeder is applied to a scanner, due to special design condition of the mechanism used by the auto-feeder, forward and backward scanning by the scanner is restricted.

SUMMARY OF THE INVENTION

Accordingly, one object of the present invention is to provide scanning speed control device that controls the running speed of a motor and reduces probability of moving forward and backward without sacrificing scanning speed. An up-down counter is used to record current transaction volume of an image buffer so that an appropriate scanning speed can be set to optimize the scanning speed.

To achieve these and other advantages and in accordance with the purpose of the invention, as embodied and broadly described herein, the invention provides a control device for controlling the scanning speed of a scanner. The control device includes a decision device, a driving device and an input/output interface. The decision device receives input image data and transmits decision data and output image data. The driving device receives decision data and the input/output interface receives the output image data.

The decision device of this invention controls the scanning speed. The decision device includes an image buffer, an up-down counter and a comparator. The image buffer receives the input image data, stores the data temporarily in a register and finally transmits output image data. The up-down counter computes and records amount of data accessed through the image buffer, and then outputs count data. The comparator receives the count data and decides to increase or decrease current scanning speed according to the count data and finally outputs the decision data.

This invention also provides a method of controlling scanning speed of a scanner. First, count data and the largest data access volume are provided. According to a ratio between the count data and the largest data access volume, the scanning speed of the scanner is set.

In brief, utilizing the data access volume of the image buffer and the count data to the comparator, the comparator can determine if a paper is in the initial feed state, the intermediate state or the terminal-scanning state so that a different scanning speed appropriate to the particular state is employed.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
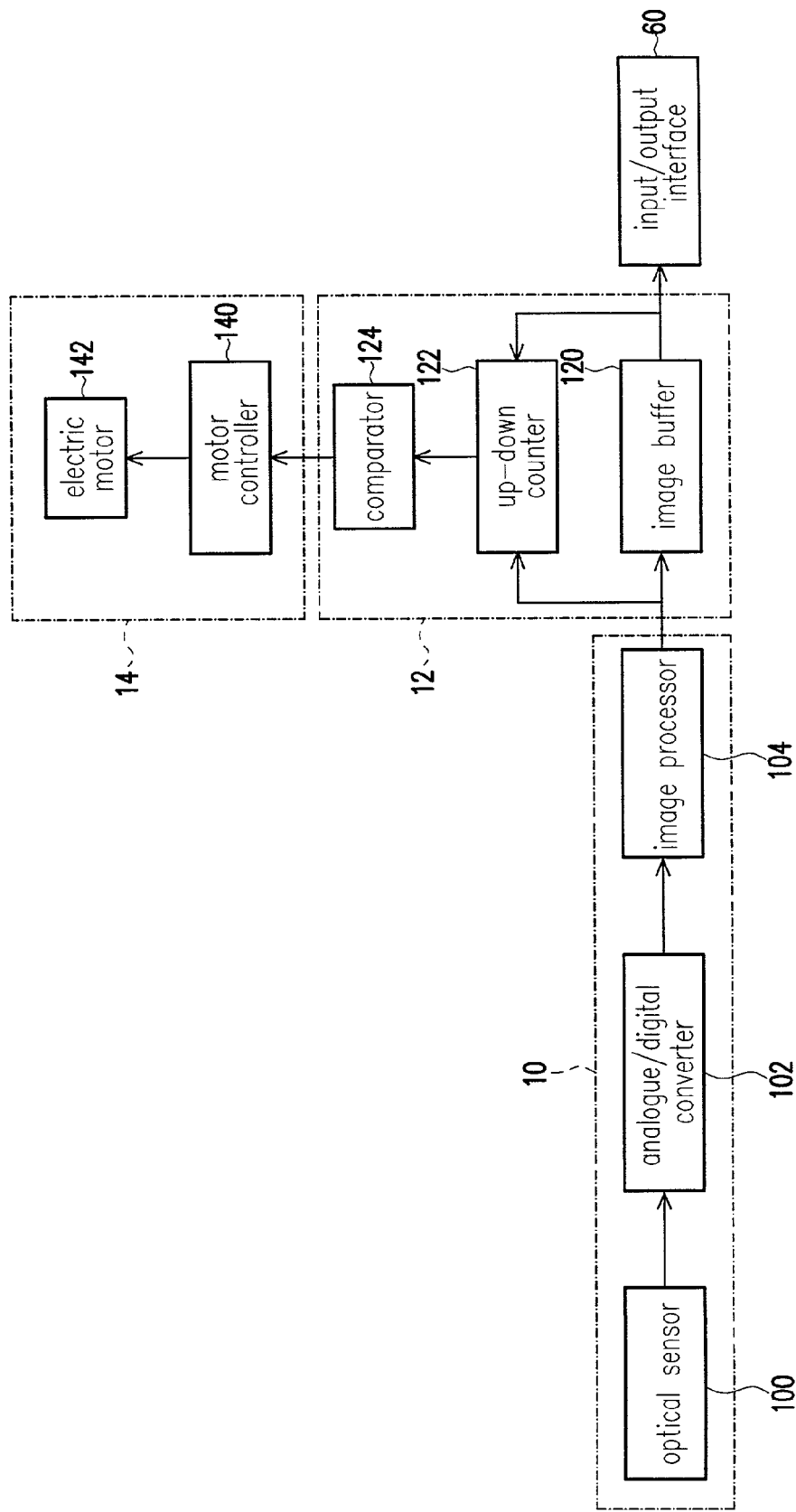
FIG. 1 is a schematic block diagram showing a scanning speed control device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram showing a scanning speed control device according to one preferred embodiment of this invention. As shown in FIG. 1, the control device includes an input device 10, a decision device 12, a driving device 14 and an input/output interface 16. The input device 10 further includes an optical sensor 100, an analogue/digital converter 102 and an image processor 104. The decision device 12 further includes an image buffer 120, a counter 122 and a comparator 124. The driving device 14 further includes a motor controller 140 and an electric motor 142.

The analogue/digital converter 102 couples with the optical sensor 100. The image processor 104 couples with the analogue/digital converter 102 and the image buffer 120. The image buffer 120 couples with the input/output interface 16. The up-down counter 122 couples with the input terminal of the image buffer 120 and the output terminal of the image buffer 120. The comparator 124 couples with the up-down counter 122 and the motor controller 140. The motor controller 140 couples with the electric motor 142.

To conduct a scanning operation, the optical sensor 100 utilizes a charge-coupled device (CCD) to detect any external signal. Each CCD cell converts the intensity of light into an electrical current. The electric current transforms into signal charges and finally appears as a voltage potential. Eventually an analogue signal is produced. The analogue signal is output from the optical sensor 100 to the analogue/digital converter 102. As soon as the analogue/digital converter 102 receives the analogue signal, the analogue signal is converted to a digital signal and the digital signal is immediately transferred to the image processor 104. Inside the image processor 104, the digital signal is processed and converted into input image data. The input image data is transferred to the image buffer 120 and the up-down counter 122.

When the image buffer 120 receives the input image data, the input image data is temporarily stored. After complete processing of the input image data inside the image buffer 120, the input image data is converted to output image data and then the output image data is transferred to the input/output interface 16 and the up-down counter 122.

When the image processor 104 outputs input image data to the image buffer 120, the up-down counter 122 enables its up-counting function so that one is added to the value inside the counter 122. Similarly, when the up-down counter senses the transfer of an output image data to the input/output interface 16, the up-down counter 122 enable its down-counting function so that one is deducted from the value inside the counter 122. After updating the count data within the up-down counter 122, the count data is transmitted to the comparator 124. In this embodiment, only one type of counting method is illustrated. Obviously, other types of counting methods are available for selection. The up-down counter 122 is a device for computing and recording data access volume of the image buffer 120 and outputting count data to the comparator 124.

The comparator 124 decides to increase or slow down the scanning speed according to the received count data and outputs decision data to the motor controller 140. The motor controller 140 controls the running speed of the electric motor 142 according to the decision data. For example, if the amount of count data in the image buffer 120 drops, this indicates the scanning is near completion. The comparator 124 informs the motor controller 140, via the decision data, to slow down the electric motor 142.

The comparator in FIG. 1 indicates the need for a method for deciding whether to increase or decrease the scanning speed of a scanner. The following is an illustration of such a decision method.

Figure 2:
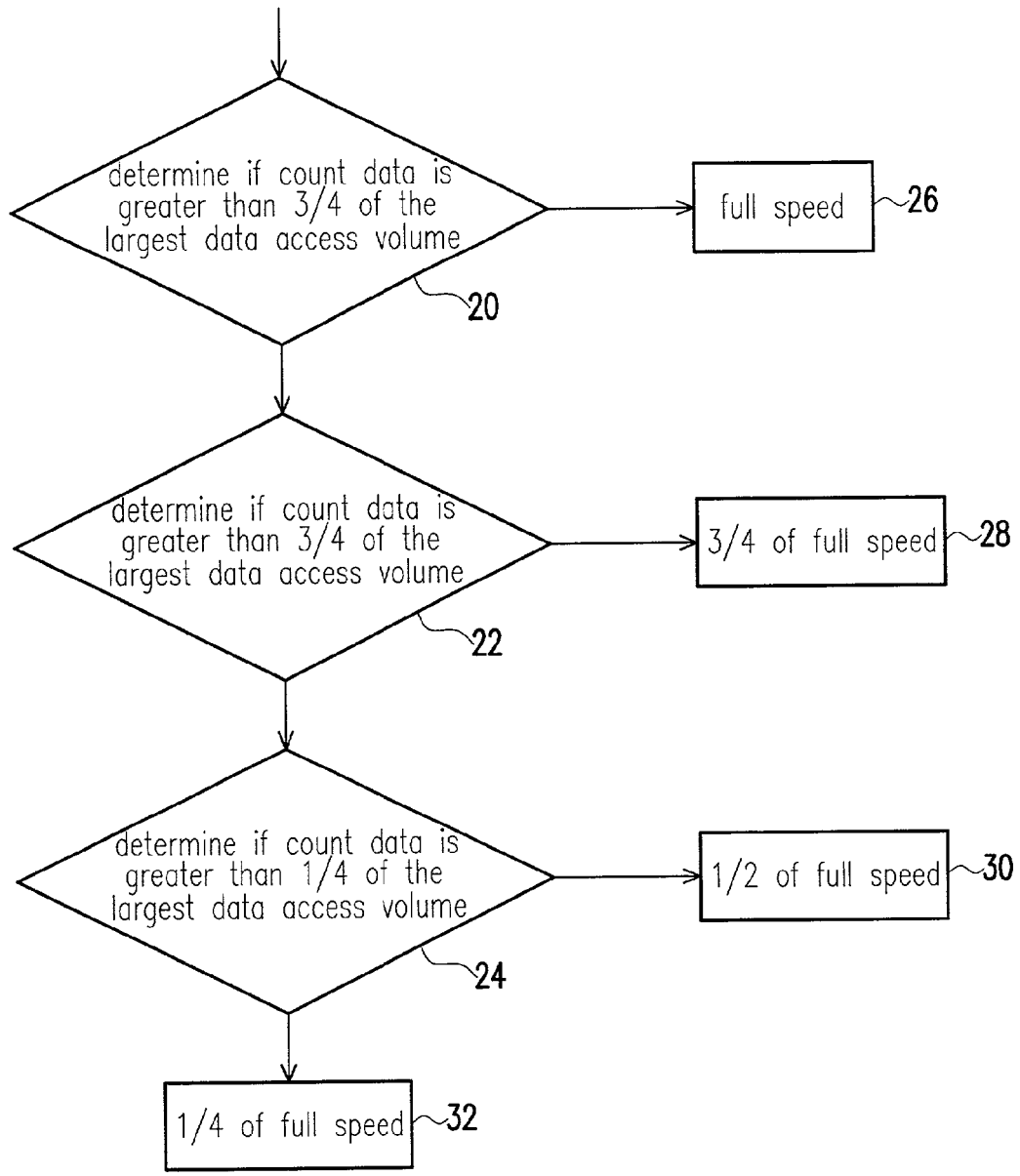
FIG. 2 is a flow diagram showing the method of controlling the scanning speed of a scanner according to one preferred embodiment of this invention.

FIG. 2 is a flow diagram showing the method of controlling the scanning speed of a scanner according to one preferred embodiment of this invention. First, count data and the largest data access volume is provided. According to a ratio of the count data over the largest data access volume, a scanning speed is set. Thereafter, as shown in FIG. 2, step 20 is executed so that whether the count data is greater than ¾ of the largest data access volume is checked. If the count data is greater than ¾ of the largest data access volume, step 26 is executed so that the scanning speed is adjusted to full speed. On the other hand, if the count data is smaller than ¾ of the largest data access volume, step 22 is executed to determine if the count data is greater or smaller than ½ of the largest data access volume. If the count data is greater than ½ of the largest data access volume, step 28 is executed such that the scanning speed is set to ¾ of the full speed. On the other hand, if the count data is smaller than ½ of the largest data access volume, step 24 is executed to determine if the count data is greater or smaller than ¼ of the largest data access volume. If the count data is greater than ¼ of the largest data access volume, step 30 is executed such that the scanning speed is set to ½ of the full speed. On the other hand, if the count data is smaller than ¼ of the largest data access volume, step 32 is executed such that the scanning speed is set to ¼ of the full speed. In practice, anybody familiar with such technique is free to decide the relationship between the scanning speed of the scanner and the data count/largest data access volume ratio.

In conclusion, one major advantage of this invention is the variation of scanning speed according to the stored data inside the image buffer so that an optimal scanning speed can be maintained even if forward/backward scanning is restricted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
   a decision device coupled to an input device, said decision device capable of receiving input image data and outputting decision data based at least in part on count data and data access volume;
   a driving device coupled to the decision device capable of receiving the decision data and capable of adjusting the scanning speed according to the decision data;
   an image buffer coupled to an output terminal of the input device capable of receiving the input image data, and temporarily storing the input image data and outputting output image data to an input/output interface coupled to the decision device;
   an up-down counter coupled to an input terminal of the image buffer and an output terminal of the image buffer capable of counting and recording data access volume inside the image buffer and outputting count data; and
   a comparator coupled to the up-down counter capable of receiving the count data, and deciding whether to increase or decrease the scanning speed according to the count data and outputting the decision data.

2. The apparatus of claim 1, wherein the up-down counter is capable of up-counting to increase a value inside the counter by one if the up-down counter detects transfer of input image data into the image buffer, and further wherein the up-down counter is capable of down-counting to decrease the value inside the counter by one if the counter detects transfer of output image data to the input/output interface.

3. The apparatus of claim 1, wherein the up-down counter is capable of down-counting to decrease a value inside the counter by one if the up-down counter detects a transfer of input image data into the image buffer, and further wherein the up-down counter is capable of up-counting to increase the value inside the counter by one if the counter detects a transfer of output image data to the input/output interface.

4. The apparatus of claim 1, wherein the input device further includes:
   an optical sensor capable of receiving an external signal and outputting an analogue signal;
   an analogue/digital converter coupled to the optical sensor capable of receiving the analogue signal and converting the analogue signal into a digital signal, and then outputting the digital signal; and
   an image processor coupled to the analogue/digital converter and the decision device capable of receiving the digital signal and converting the digital signal into the input image data, and then outputting the input image data to the decision device.

5. The apparatus of claim 1, wherein the driving device further includes: an electric motor; and a motor controller coupled to the electric motor and the decision device capable of receiving the decision data and controlling the running speed of the electric motor according to the decision data.

6. A method, comprising:
   providing count data;
   providing a largest data access volume; and
   determining the scanning speed of a scanner according to a ratio between the count data and the largest data access volume, wherein the scanner scans at a speed comprising one or more of the following: approximately full speed if the count data is greater than approximately ¾ of the largest data access volume, approximately ¾ of full speed if the count data is smaller than approximately ¾ of the largest data access volume but greater than approximately ½ of the largest data access volume, approximately ½ of full speed if the count data is smaller than approximately ¾ of the largest data access volume but greater than approximately ¼ of the largest data access volume, and/or approximately ¼ of full speed if the count data is smaller than approximately ¼ of the largest data access volume, or combinations thereof.

7. The method of claim 6, wherein the scanner scans at a speed comprising: approximately full speed if the count data is greater than approximately ¾ of the largest data access volume, approximately ¾ of full speed if the count data is smaller than approximately ¾ of the largest data access volume but greater than approximately ½ of the largest data access volume, approximately ½ of full speed if the count data is smaller than approximately ¾ of the largest data access volume but greater than approximately ¼ of the largest data access volume, and approximately ¼ of full speed if the count data is smaller than approximately ¼ of the largest data access volume.

8. An apparatus, comprising:
   means for providing count data;
   means for providing a largest data access volume; and
   means for determining the scanning speed of a scanner according to a ratio between the count data and the largest data access volume, wherein the scanning speed comprises one or more of the following: approximately full speed if the count data is greater than approximately ¾ of the largest data access volume, approximately ¾ of full speed if the count data is smaller than approximately ¾ of the largest data access volume but greater than approximately ½ of the largest data access volume, approximately ½ of full speed if the count data is smaller than approximately ¾ of the largest data access volume but greater than approximately ¼ of the largest data access volume, and/or approximately ¼ of full speed if the count data is smaller than approximately ¼ of the largest data access volume, or combinations thereof.

9. The apparatus of claim 8, wherein the scanning speed comprises: approximately full speed if the count data is greater than approximately ¾ of the largest data access volume, approximately ¾ of full speed if the count data is smaller than approximately ¾ of the largest data access volume but greater than approximately ½ of the largest data access volume, approximately ½ of full speed if the count data is smaller than approximately ¾ of the largest data access volume but greater than approximately ¼ of the largest data access volume, and approximately ¼ of full speed if the count data is smaller than approximately ¼ of the largest data access volume.

* * * * *

UNITED STATES PATENT AND TRADEMARK OFFICE
CERTIFICATE OF CORRECTION

PATENT NO. : 7,248,387 B2  
APPLICATION NO. : 09/920387  
DATED : July 24, 2007  
INVENTOR(S) : Kuo-Jeng Wang Page 1 of 1

It is certified that error appears in the above-identified patent and that said Letters Patent is hereby corrected as shown below:

On the Title Page  
Item (73), Column 1, line 6 (Assignee): Delete "Umax Data Systems, Inc., Hsinchu, Taiwan (CN)" and replace with --Transpacific IP, Ltd., Taipei, Taiwan (CN)--.

Signed and Sealed this  
Fifteenth Day of October, 2013

Teresa Stanek Rea  
*Deputy Director of the United States Patent and Trademark Office*